Patented Nov. 3, 1953　　　　　　　　　　　　　　　　　　　　　　　　　2,658,079

UNITED STATES PATENT OFFICE 2,658,079

PROCESS OF HALOGENATING THE π-POSITION OF CAMPHOR AND ITS α-HALODERIVATIVES

Hiroshi Nishimitsu, Suma-Ku, Kobe, Masamoto Nishikawa, Nishinomiya, and Hikoichi Hagihara, Toyonaka, Japan, assignors to Takeda Yakuhin Kogyo Kabushikigaisha, Doshomachi, Higashi-Ku, Osaka-Shi, Japan No Drawing. Application May 29, 1951,
Serial No. 229,003

Claims priority, application Japan June 10, 1950

3 Claims. (Cl. 260—587)

This invention relates to a process of halogenating the π-position of camphor and its α-haloderivatives which are represented by the general formula:

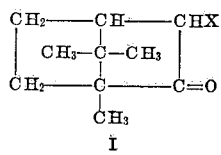

wherein X stands for one of the group consisting of H and halogen.

Both π-halocamphor and α,π-dihalocamphor are important intermediates for the preparation of cardioactive agents, and they have so far been prepared through three steps according to the following scheme, the yields being about 20 per cent of the theoretical;

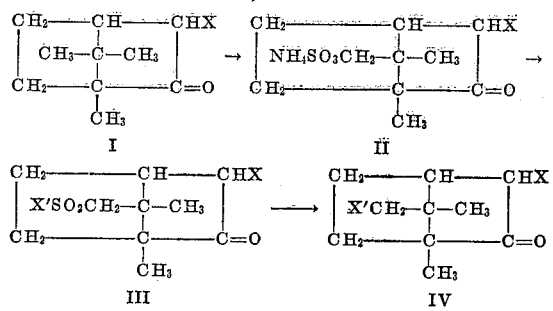

wherein X stands for one of the group consisting of H and halogen, X' stands for halogen.

The present invention provides a process of halogenating the π-position of camphor and its α-haloderivatives only in one step, and that with good yields. The process comprises dissolving the compounds represented by the general Formula I or their solutions in an indifferent solvent such as chloroform or carbontetrachloride in a solvent selected from the group consisting of sulphuric acid containing 0–25% of $SO_3$, chlorosulfonic acid and a mixture of both and adding halogen thereto in a practically anhydrous condition. As solvent sulphuric acid containing more than 25% of $SO_3$ cuts down the yield. When a mixture of the two acids is used, their proportions are optional. In this reaction the equimolecular or a little smaller amount of halogen is sufficient, because the hydrogen halide formed in this reaction is reduced to halogen during the reaction and spent again for the halogenation of the π-position. As in the conventional halogenations, this process proceeds most smoothly at about 10° C., a lower temperature requires more time and a temperature higher than 30° C. causes the substitution of another radical such as the sulfonic acid radical at the π-position, and consequently, lowers the yield. Therefore, in order to prevent the evolution of reaction heat, halogen is generally introduced gradually and, if necessary, the reaction mixture is cooled. Incidentally, under these conditions halogen does not attach the α- or other positions of camphor and its α-haloderivatives. The reaction mixture is then poured into ice-water to decompose the oleum or chlorosulfonic acid and the resultant π-halocamphor or α,π-dihalocamphor is purified by steam distillation or by recrystallization from a suitable solvent such as methanol or benzine. The melting point of π-bromocamphor purified in this manner is 93° C., α,π-dibromocamphor 156°, α-chloro-π-bromocamphor 137–8° C., α,π-dichlorocamphor 119° C., and they all coincide with those of authentic samples. The π-halocamphors prepared by this method are racemi-type, while α,π-dihalocamphors are optically active. The yields in this process are 50–80% of the theoretical, that is, 2.5–4 times better than those in the methods hitherto known. The reaction of the present invention is represented as follows:

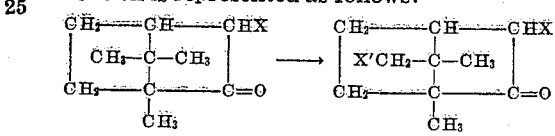

wherein X stands for one of the group consisting of H and halogen, and X' stands for halogen.

*Example 1*

Sixteen grams of camphor is dissolved in 40 cc. of oleum containing 13–15% of $SO_3$ (sp. gr. 1,918), cooling with ice-water, and then 16 g. of bromine is dropped therein with shaking. The mixture is allowed to stand at room temperature for six days with occasional shaking. The reaction mixture is poured into water and, after neutralizing with sodium carbonate and decolorizing with sodium thiosulfate, extracted with ether. The ether is removed from the extract and the residue is subjected to steam distillation, when some unreacted camphor is recovered. The remaining crude product (15 g.) is recrystallized first from methanol, then from benzine, whereupon 12.2 g. of π-bromocamphor melting at 93° C. is obtained. The yield is 50% of the theoretical. Specific rotation $[α]_D = 0$ (in alcohol).

*Example 2*

Fifteen grams of α-bromocamphor is dissolved in 50 g. of oleum containing 4–5% of $SO_3$ (sp. gr. 1.872), cooling with ice-water and then 11 g. (1.1 mol.) of bromine is dropped therein with shaking, and the mixture is allowed to stand at room temperature for 10 days. The reaction mixture is worked up as in the case of Example 1 and the resultant crude product (13 g.) is recrystallized from methanol, when 11 g. of $\alpha,\pi$-dibromocamphor melting at 154° C. is obtained. The specific rotation $[\alpha]_D^2 = 98.3°$ (in chloroform).

*Example 3*

To 15 cc. of chlorosulfonic acid cooled with ice is added 20 g. of camphor and then 20 g. of bromine, and the mixture is allowed to stand in a light place at about 20° C. for three days with occasional shaking. The reaction mixture is poured into ice-water and, after neutralizing with sodium carbonate, extracted with ether. The ether is distilled off and the residue (26 g.) is recrystallized from benzine, whereupon 11 g. of $\pi$-bromocamphor melting at 93° C. is obtained.

*Example 4*

Fifteen grams of camphor is dissolved in 15 cc. of cold chlorosulfonic acid and chlorine generated from 200 cc. of concentrated hydrochloric acid and 80 g. of potassium permanganate is passed therein over a period of 10 hours. During all the time the apparatus is placed in a light place and the reaction mixture is kept at 25° C. When the reaction is complete, the reaction mixture is poured into ice-water and the separated product is washed with water and then taken up in ether. The ethereal solution is washed with sodium carbonate solution and dried. After removal of the ether, the residue melting at 110–120° (15 g.) is recrystallized from benzine, whereupon 9 g. of $\pi$-chlorocamphor melting at 139° is obtained.

*Example 5*

To 55 g. of chlorosulfonic acid is added a solution of 15 g. of camphor in 10 cc. of chloroform and then 8 g. (½ mol.) of bromine, cooling with ice-water, and the mixture is allowed to stand at room temperature overnight. Next day 5 g. of additional bromine is added and the standing is continued for 24 hours in all. The reaction mixture is poured into ice-water and extracted with ether. The ether is removed from the extract, and the light yellow residue (23 g.) is recrystallized from benzine, whereupon 15.5 g. of $\pi$-bromocamphor melting at 91° C. is obtained. The yield is 67% of the theoretical.

*Example 6*

To a mixture of 200 g. of 100% sulphuric acid and 72 g. of chlorosulfonic acid is added 50 g. of $\alpha$-bromo-camphor and then 25 g. (0.72 mol.) of bromine with stirring and cooling at a temperature lower than 10° C., and the stirring is continued for 4.5 hours at 5–10° C. The reaction mixture is poured into ice-water and, after neutralizing with sodium carbonate, extracted with benzene. When the benzene is distilled off, 53 g. of the product melting at 144–149° C. is obtained. Though this product is still a little impure, the yield is 80% of the theoretical. The product is recrystallized from a little alkaline methanol, whereupon pure $\alpha,\pi$-dibromocamphor melting at 156° C. is obtained.

The yield is 65–70% of the theoretical.

What we claim is:

1. A process of preparing a compound corresponding to the formula

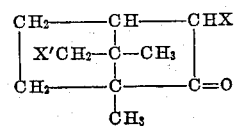

wherein X stands for a member selected from the group consisting of H and halogen, and X' stands for halogen, which comprises dissolving a compound corresponding to the formula

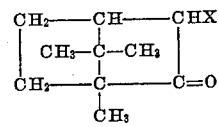

wherein X has the precedingly-recited significance, in a solvent selected from the group consisting of oleum, chlorosulfonic acid and a mixture of both, and then introducing halogen therein in a practically anhydrous condition at a temperature lower than 30° C.

2. A process of preparing a compound corresponding to the formula

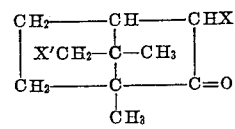

wherein X stands for a member selected from the group consisting of H and halogen, and X' stands for halogen, which comprises dissolving a compound corresponding to the formula

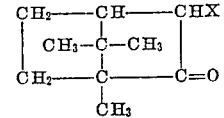

wherein X has the precedingly-recited significance, in a solvent selected from the group consisting of oleum, chlorosulfonic acid and a mixture of both, and then introducing a member selected from the group consisting of chlorine and bromine at a temperature lower than 30° C.

3. A process of preparing a compound corresponding to the formula

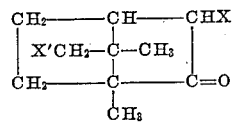

wherein X stands for a member selected from the group consisting of H and halogen, and X' stands for halogen, which comprises dissolving a compound corresponding to the formula

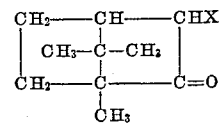

wherein X has the precedingly-recited significance, in sulfuric acid containing 0–25% of $SO_3$, and then introducing a member selected from the group consisting of chlorine and bromine in a practically anhydrous condition at a temperature lower than 30° C.

HIROSHI NISHIMITSU.
MASAMOTO NISHIKAWA.
HIKOICHI HAGIHARA.

References Cited in the file of this patent

Kipping et al. J. Chem. Soc., vol. 63, pages 548–604 pages 549–554, 577, 578, 594 are the most pertinent), (1893); vol. 67, pages 354–398 (pages 371–373 are the most pertinent), (1895).